US012193363B2

(12) United States Patent
Zhu et al.

(10) Patent No.: US 12,193,363 B2
(45) Date of Patent: *Jan. 14, 2025

(54) MOWER SYSTEM AND CONNECTING DEVICE THEREOF

(71) Applicant: Greenworks (Jiangsu) Co., Ltd, Jiangsu (CN)

(72) Inventors: Fei Zhu, Jiangsu (CN); Qunli Wei, Jiangsu (CN); Shengwen Zhang, Jiangsu (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,524

(22) Filed: Nov. 9, 2023

(65) Prior Publication Data

US 2024/0074350 A1 Mar. 7, 2024

Related U.S. Application Data

(63) Continuation of application No. 17/012,996, filed on Sep. 4, 2020, now Pat. No. 11,849,674.

(30) Foreign Application Priority Data

Sep. 4, 2019 (CN) .......................... 201910830700.6

(51) Int. Cl.
| | |
|---|---|
| *A01D 43/00* | (2006.01) |
| *A01B 59/06* | (2006.01) |
| *A01D 34/64* | (2006.01) |
| *E01H 5/06* | (2006.01) |
| *E01H 5/09* | (2006.01) |
| *E02F 3/76* | (2006.01) |
| *A01D 101/00* | (2006.01) |

(52) U.S. Cl.
CPC ............ *A01D 43/00* (2013.01); *A01B 59/065* (2013.01); *E01H 5/061* (2013.01); *E01H 5/098* (2013.01); *E02F 3/7618* (2013.01); *A01D 34/64* (2013.01); *A01D 2101/00* (2013.01)

(58) Field of Classification Search
CPC .... A01D 43/00; A01D 34/64; A01D 2101/00; A01B 59/065; E01H 5/061; E01H 5/098; E02F 3/7618
USPC .......................................... 37/231
See application file for complete search history.

(56) References Cited

U.S. PATENT DOCUMENTS

| | | | | |
|---|---|---|---|---|
| 4,919,212 A | * | 4/1990 | McClure ............... | E02F 3/7613 172/820 |
| 2002/0148211 A1 | * | 10/2002 | Templeton ............. | A01D 34/84 56/17.1 |
| 2006/0096133 A1 | * | 5/2006 | Sanders ................ | A01D 42/08 37/241 |

* cited by examiner

*Primary Examiner* — Mahmoud Gimie (57) ABSTRACT

A mower system comprising a powered mower, a connecting device connected to the powered mower and an attachment connected to the powered mower through the connecting device for conducting specified function during the operation of the mower system. The connecting device includes a mounting assembly mounted to the powered mower and a base rotatably mounted to the mounting assembly for driving the attachment being rotated together with the base in a horizontal plane relative to the powered mower. The utilization rate of the powered mower is effectively improved because other working functions can be conducted by the attachment which is connected to the powered mower through the connecting device.

18 Claims, 9 Drawing Sheets

MOWER SYSTEM AND CONNECTING DEVICE THEREOF

CROSS-REFERENCE TO RELATED INVENTIONS

The present application is a Continuation Application of U.S. patent application Ser. No. 17/012,996 filed on Sep. 4, 2020 which claims the priority of CN Application Serial No. 201910830700.6, filed on Sep. 4, 2019, the disclosures of which are hereby incorporated by reference in their entirety.

TECHNICAL FIELD

The invention relates to a mower system having a connecting device connecting other attachments to the mower for achieving other working functions.

BACKGROUND ART

A lawn mower is usually used for cutting grass in spring, summer and autumn, but doesn't work in winter and is in an idle state. Even if the lawn mower is in an idle state in winter, the battery pack used for supplying power to the lawn mower still needs to be charged to prevent from damaging caused by long-term power shortage, thereby the maintenance cost of the lawn mower is increased. In addition, the utilization rate of the lawn mower is low when the lawn mower in an idle state in winter.

In view of the above problems, it is desirable to provide a mower system having connecting device to overcome the above problems.

SUMMARY OF INVENTION

The present invention provides a connecting device which can connect an attachment to the powered mower to expand functions of the powered mower, effectively improve utilization rate of the vehicle, and also reduce use cost and maintenance cost of the vehicle.

To achieve the above object, the present invention provides a connecting device for connecting an attachment to a mower system, the attachment conducting specified function during the operation of the mower system, the connecting device comprising a mounting assembly and a base rotatably mounted to the mounting assembly for driving the attachment to rotate relative to the mower system in a horizontal plane.

As a further improvement of the invention, the connecting device includes at least one connecting frame pivotally connected to the mounting assembly, and the base is connected to the mounting assembly through the connecting frame.

As a further improvement of the invention, the mounting assembly and the base are respectively located at two opposite ends of the connecting frame.

As a further improvement of the invention, the connecting device further includes a pivoting base fixedly mounted to the connecting frame, and the base is rotatably mounted to the pivoting base.

As a further improvement of the invention, the base is positioned to the desired position relative to the pivoting base after being rotated.

As a further improvement of the invention, a limiting mechanism is formed between the pivoting base and the base for limiting the relative position of the pivoting base and the base.

As a further improvement of the invention, the limiting mechanism includes a plurality of positioning slots and a positioning member engaging with the positioning slots.

As a further improvement of the invention, the positioning slots are formed on one of the pivoting base and the base and the positioning member is formed on the other one of the pivoting base and the base.

As a further improvement of the invention, the pivoting base includes a supporting plate fixedly mounted to the connecting frame and a top plate fixedly mounted to the supporting plate, and the base is rotatably sandwiched between the supporting plate and the top plate.

As a further improvement of the invention, a protrusion is formed between the supporting plate and the top plate, and the base has a receiving hole corresponding to the protrusion for receiving the protrusion.

As a further improvement of the invention, the protrusion is formed a part of at least one of the supporting plate and the top plate.

As a further improvement of the invention, the protrusion is a pivot separated from both the supporting plate and the top plate.

As a further improvement of the invention, the supporting plate defines a plurality of first positioning slots and the top plate defines a plurality of second positioning slots corresponding to the first positioning slots.

As a further improvement of the invention, a positioning member is provided on the base for engaging with the first and second positioning slots.

As a further improvement of the invention, the connecting device further includes a controlling assembly connected to the base, and the base is positioned to the desired position after being rotated through the controlling assembly engaging with the pivoting base.

As a further improvement of the invention, the base has a beam extended between two opposite sides thereof for connecting the controlling assembly thereto, and the controlling assembly is lifted in vertical direction relative to the base and rotated together with the base in a horizontal plane.

As a further improvement of the invention, the controlling assembly includes a positioning member extending downwardly therefrom, and the pivoting base includes a plurality of positioning slots for engaging with the positioning member.

In order to achieve the above object, the present invention also provides a mower system comprising a powered mower, a connecting device connected to the powered mower and an attachment connected to the powered mower through the connecting device for conducting specified function during the operation of the mower system, the connecting device including a mounting assembly mounted to the powered mower and a base rotatably mounted to the mounting assembly for driving the attachment being rotated together with the base in a horizontal plane relative to the powered mower.

As a further improvement of the invention, the attachment is one of the blower, snow thrower, snow shovel, cultivating device.

As a further improvement of the invention, the attachment is lifted in a vertical direction relative to the powered mower through the connecting device.

The above general description and the following detailed description are intended to be illustrative and not restrictive.

DESCRIPTION OF EMBODIMENT

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with the present invention. On the contrary, they are only examples of devices, systems, machines and methods consistent with some aspects of the invention as detailed in the appended claims.

Figure 1:
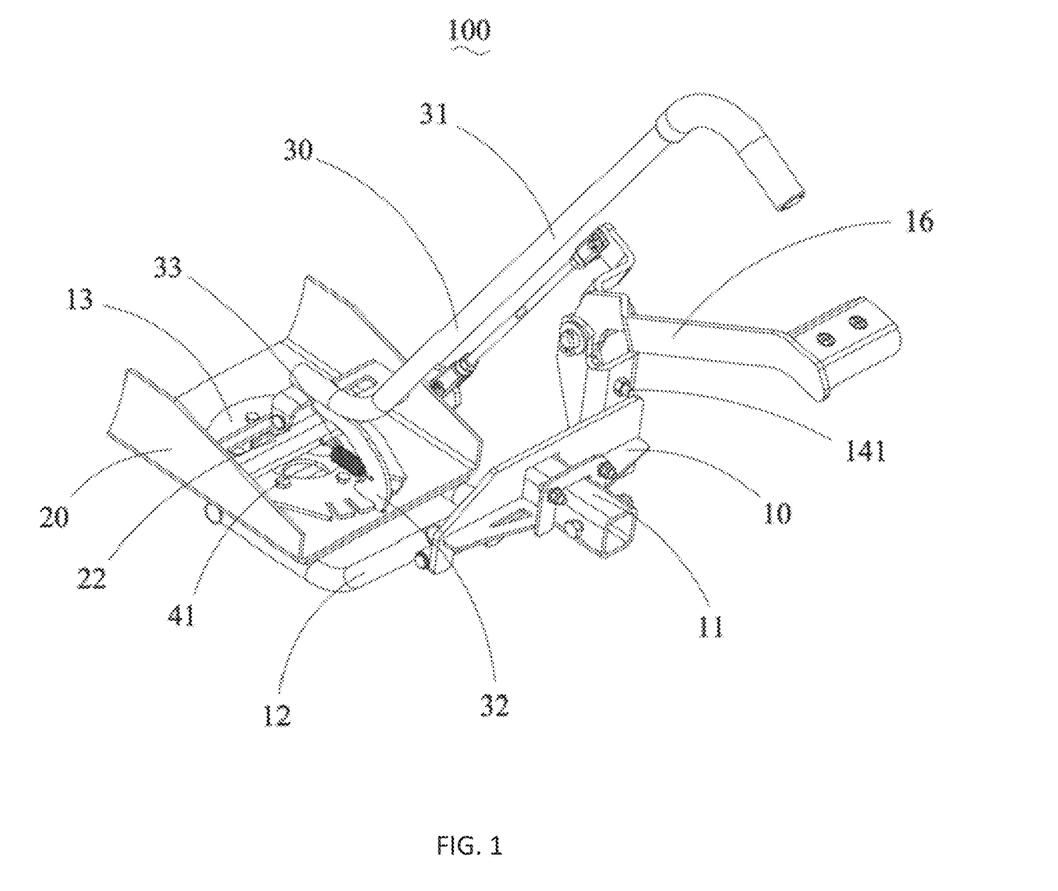
FIG. 1 is a perspective view of a connecting device of a mower system in accordance with one embodiment of the present invention.
Figure 2:
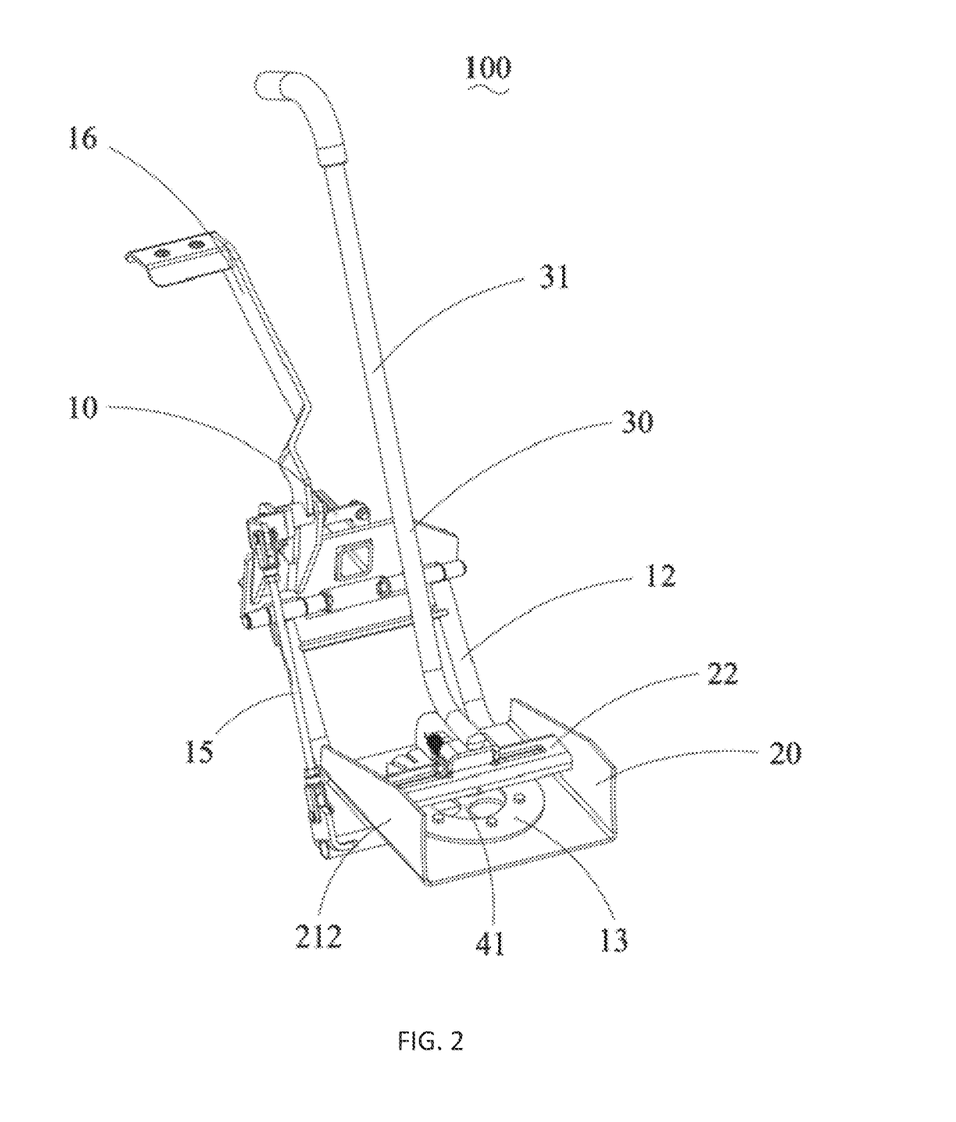
FIG. 2 is another perspective view of the connecting device shown in FIG. 1.

Referring to FIGS. 1 and 2, a connecting device 100 according to the present invention includes a mounting assembly 10, a base 20 pivotally mounted to the mounting assembly 10 through a pivot 41, and a controlling assembly 30 connected to the base 20.

Figure 3:
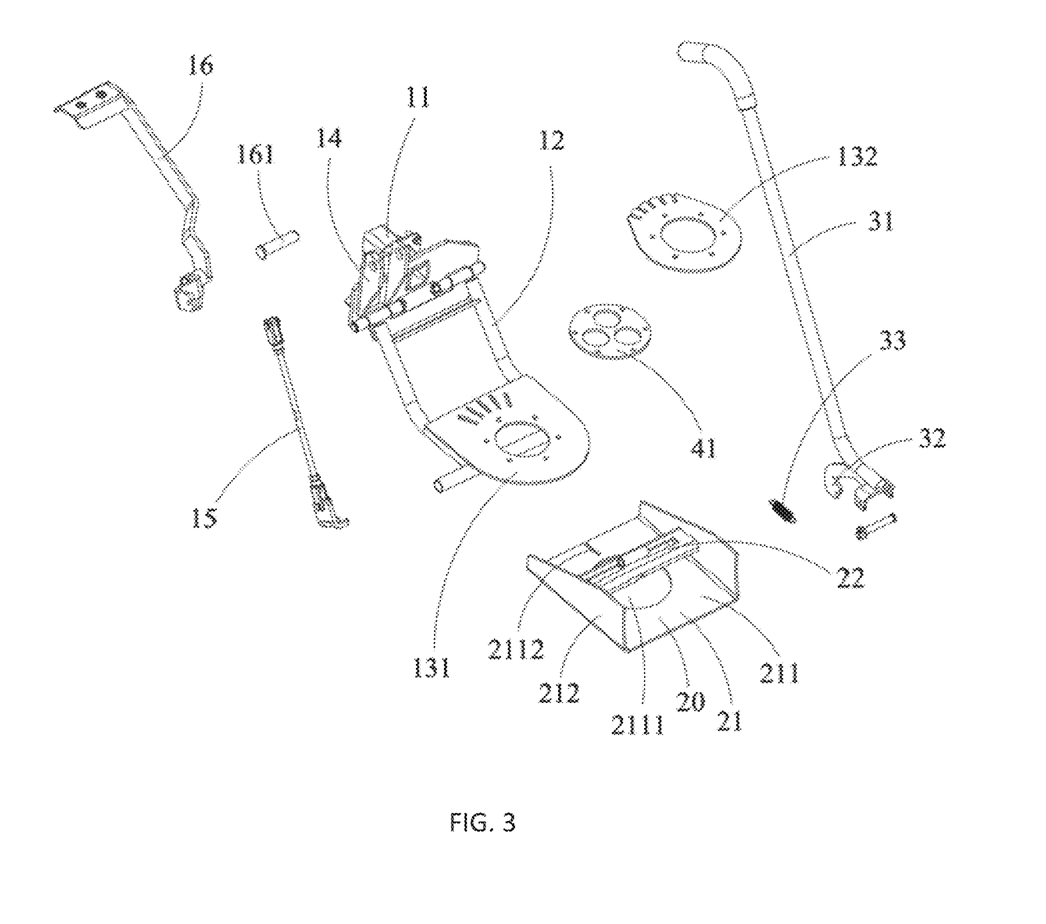
FIG. 3 is an exploded perspective view of the connecting device shown in FIG. 1.
Figure 4:
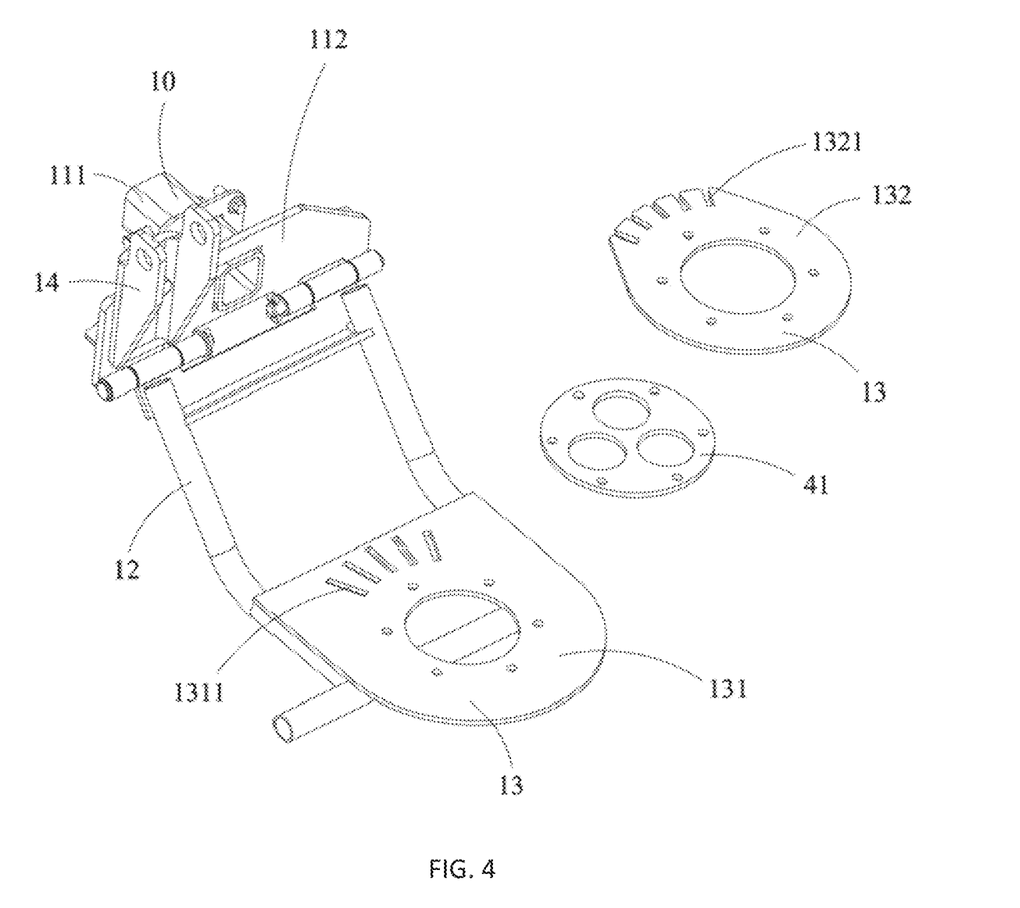
FIG. 4 is a perspective view of a mounting assembly of the connecting device shown in FIG. 3.
Figure 5:
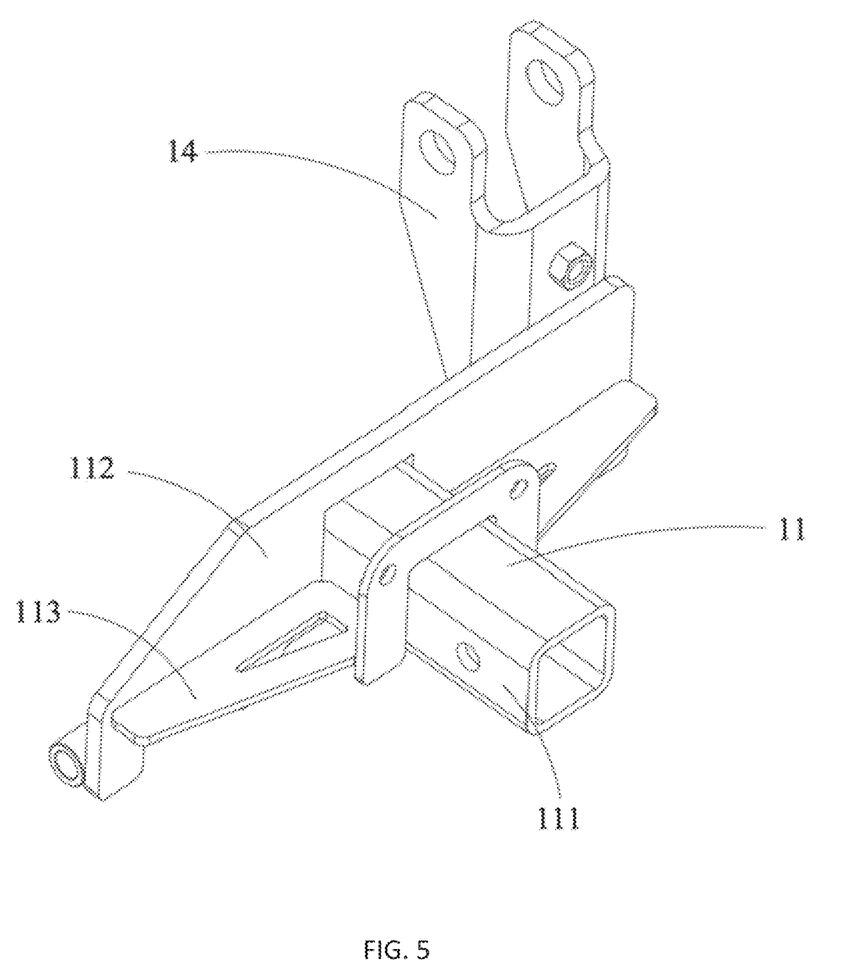
FIG. 5 is a perspective view of a part of the mounting assembly showing a base engages with a bracket shown in FIG. 4.

Referring to FIGS. 3 and 4, the mounting assembly 10 is detachably mounted to a powered mower 200. The powered mower could be a lawn mower, a bulldozer, a scraper, a tractor, a truck, a car, or other vehicle can be connected with the connecting device. In this embodiment, the powered mower is a vehicle. The mounting assembly 10 comprises a mounting body 11, a plurality of connecting frames 12 pivotally mounted to the mounting body 11, a pivoting base 13 fixedly mounted to the connecting frames 12, a bracket 14 fixedly mounted to the mounting body 11, an adjusting rod 16 pivotally mounted to the bracket 14 and a connecting rod 15 mounted between the pivoting base 13 and the adjusting rod 16. Referring to FIG. 5, the mounting body 11 includes a mounting rod 111 configured as a rectangular tube, a mounting plate 112 fixedly mounted to the mounting rod 111 and a plurality of reinforcing ribs 113 formed between the mounting plate 112 and the mounting rod 111. The mounting rod 111 can engage with the corresponding portion of the vehicle for mounting the connecting device 100 to the vehicle 200. The mounting plate 112 and the mounting rod 111 together form a T-shaped structure. The reinforcing ribs 113 engage with the mounting rod 111 and the mounting plate 112 to enhance the connection strength between the mounting rod 111 and the mounting plate 112. The connecting frame 12 is pivotally mounted to the mounting plate 112.

Referring to FIG. 4, the pivoting base 13 mounted on the connecting frame 12 includes a supporting plate 131 fixedly mounted on the connecting frame 12, a top plate 132 mounted on the supporting plate 131 and a pivot 41 sandwiched between the supporting plate 131 and the top plate 132. The supporting plate 131, the top plate 132 and the pivot 41 are assembled together through screws. The supporting plate 131 includes a plurality of first positioning slots 1311 distributed along a circumference direction thereof. The top plate 132 is provided with a plurality of second positioning slots 1321 corresponding to the first positioning slots 1311. The second positioning slots 1321 are distributed along a circumference direction of the top plate 132. An angle between two adjacent first positioning slots 1311 within a range between 12 and 15 degrees. An angle between two adjacent second positioning slots 1321 within a range between 12 and 15 degrees. Of course, the degrees of the angle can also be designed as required. In this embodiment, the first and second positioning slots 1311, 1321 are distributed at equal intervals, but in other embodiments, the first and second positioning slots 1311, 1321 may also be distributed at different intervals. The amounts of the first positioning slots 1311 and the second positioning slots 1321 may be set as required.

Figure 7:
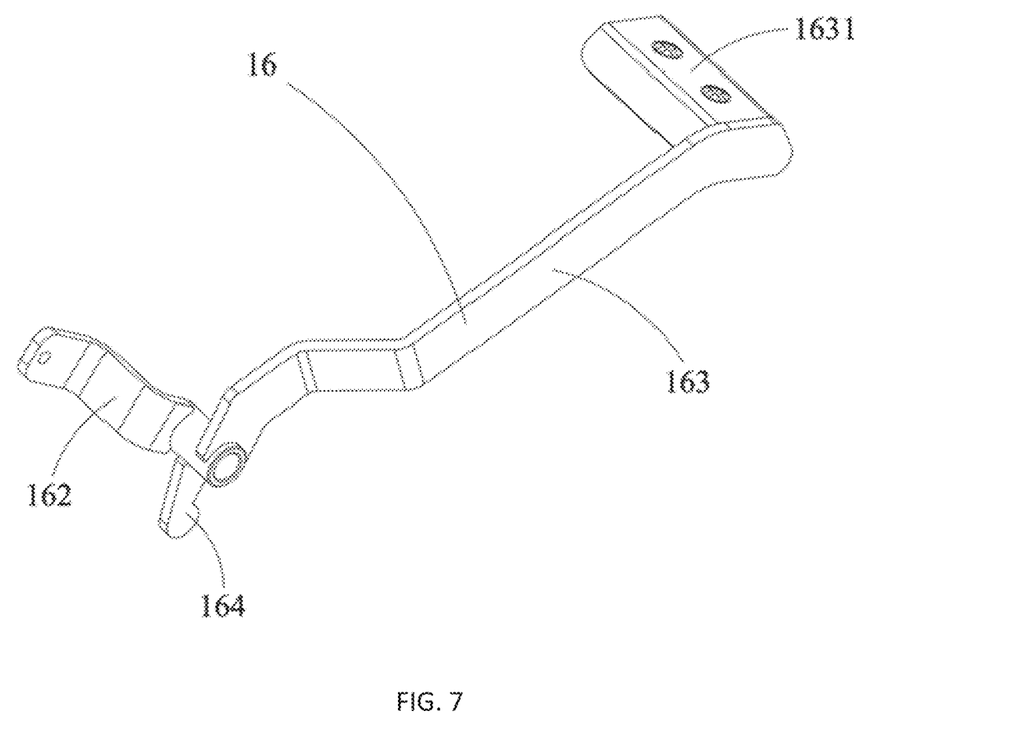
FIG. 7 is a perspective view of an adjustment lever of the connecting device shown in FIG. 3.

Referring to FIG. 5, the bracket 14 is fixedly mounted to the mounting plate 112 of the mounting body 11 for pivotally connecting the adjusting rod 16 to the mounting body 11. The bracket 14 is provided with a limiting member 141 for engaging with adjusting rod 16 to limit the vertical movement of the adjusting rod 16. Referring to FIG. 2 and FIG. 3, one end of the connecting rod 15 is pivotally mounted to a portion of the connecting frame 12 closed to the base 20, the other end of the connecting rod 15 is pivotally mounted to the adjusting rod 16. The base 20 can be lifted up by the connecting rod 15 when the adjusting rod 16 is depressed. Referring to FIGS. 2, 3 and 7, the adjusting rod 16 pivotally mounted to the bracket 14 through a rotating shaft 161 includes a driven rod 162 engaging with the connecting rod 15, a driving rod 163 extending upwardly from the driven rod 162, and a limiting arm 164 extending downwardly from the driven rod 162. The driven rod 162 defines one end configured with a hollow cylindrical shape for receiving the rotating shaft 161. The driving rod 163 and the limiting arm 164 are located at the same side of the driven rod 162. The driven rod 162 and the driving rod 163 are located at two sides of the rotating shaft 161. The other end of the connecting rod 15 is pivotally mounted on the driven rod 162. The driving rod 163 is provided with a pressing portion 1631 located at one end thereof. The pressing portion 1631 is located at the end of the driving rod 163 away from the rotating shaft 161. The limiting arm 164 can abut against the limiting member 141 of the bracket 14 to limit the vertical movement of the base 20. In this embodiment, the pressing portion 1631 is a pedal for operator to depress for lifting the base 20. In other embodiments, the pressing portion 1631 may be driven by a power device, for example: an air cylinder or hydraulic device or motor. Referring to FIG. 1, the bracket 14 is provided with a limiting member 141 for engaging with the limiting arm 164. The limiting member 141 abuts against the limiting arm 164 to limit the highest position of the driving rod 163. In this embodiment, the limiting member 141 is a screw mounted on the bracket 14.

Referring to FIG. 3, the base 20 is sandwiched between the supporting plate 131 and the top plate 132 and can rotate relative to the pivot 41 in a horizontal plane. The base 20 includes a fixing frame 21 and a beam 22 located on the fixing frame 21. The fixing frame 21 includes a base plate 211 and two extending arms 212 bending and extending from two sides of the base plate 211. The base plate 211 has a receiving hole 2111 for receiving the pivot 41 and a through slots 2112 for allowing a portion of controlling assembly 30 passing through to limit the rotating of the base 20 relative to the pivot 41. The beam 22 is bridged two extending arms 212 and located above the receiving hole 2111. An end of the base 20, which is away from the mounting body 11, is used for mounting with an attachment. The attachment is a device which can implement specified working function, such as a blower, a snow shovel, a snow sweeping device, a dozer blade, a transport blade, a cultivating device, a plowing device, etc. In this embodiment, the base 20 and the attachment are separated, but in other embodiments, the base 20 and the attachment may be integrated.

Figure 6:
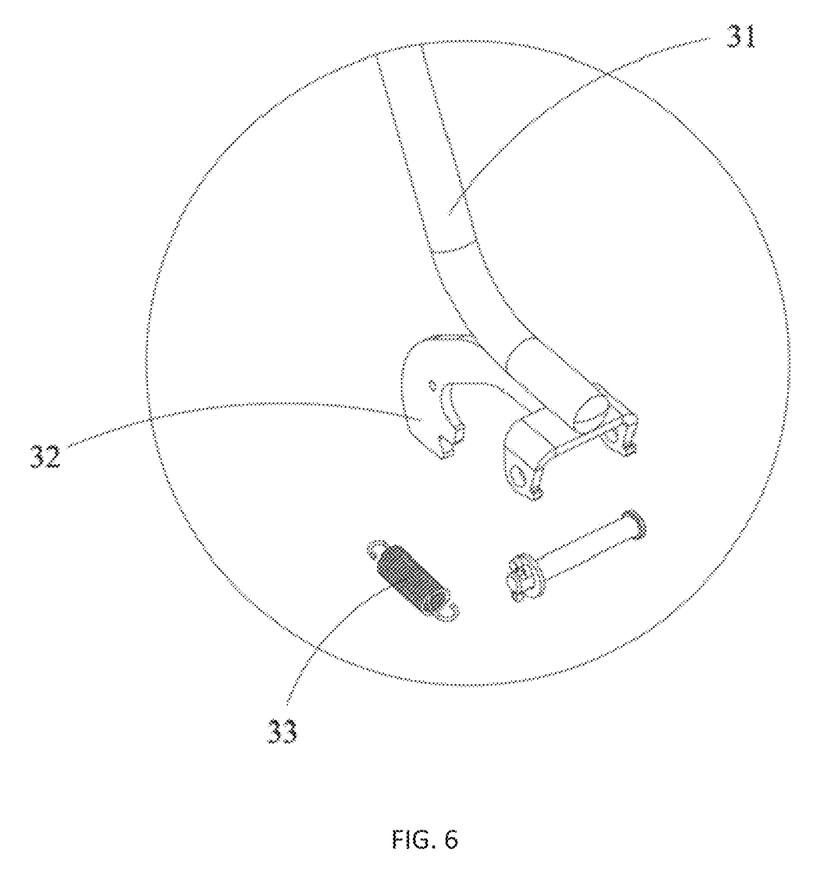
FIG. 6 is a perspective view of a controlling assembly of the connecting device shown in FIG. 3.

Referring to FIGS. 2, 3 and 6, the controlling assembly 30 includes a controlling rod 31 mounted to the beam 22 of the base 20, the positioning member 32 disposed on the controlling rod 31 and a restoring elastic element 33 located between the beam 22 and the positioning member 32. The controlling rod 31 is pivotally mounted on the beam 22 of the base 20 and can rotate together with the base 20 relative to the pivot 41. The controlling rod 31 can be lifted relative to the base 20 in a vertical direction. The positioning member 32 is located at an end of the controlling rod 31 closed to the base 20 and cooperates with the first and second positioning slots 1311, 1321 for limiting the rotating of the base 20 relative to the pivot 41. In this embodiment, the positioning member 32 is a positioning plate inserting into the first and second positioning slots 1311, 1321 and being substantially L-shaped structure. In other embodiments, the positioning slots can be located on the controlling rod 31, and the positioning member 32 can be located on the pivoting base 13 for engaging with the positioning slots of the controlling rod 31. Referring to FIG. 1, one end of the restoring elastic element 33 is installed at one end of the positioning member 32 closed to the second positioning slots 1321, and the other end of the restoring elastic element 33 is installed on the beam 22 of the base 20. The restoring elastic element 33 can be deformed when the controlling rod 31 is lifted upwardly and can constrain the positioning member 32 in the first and second positioning slots 1311, 1321. The first and second positioning slots 1311, 1321 and the positioning member 32 are formed as a limiting mechanism located between the pivoting base 13 and the base 20 for limiting the relative position of the pivoting base 13 and the base 20.

Figure 8:
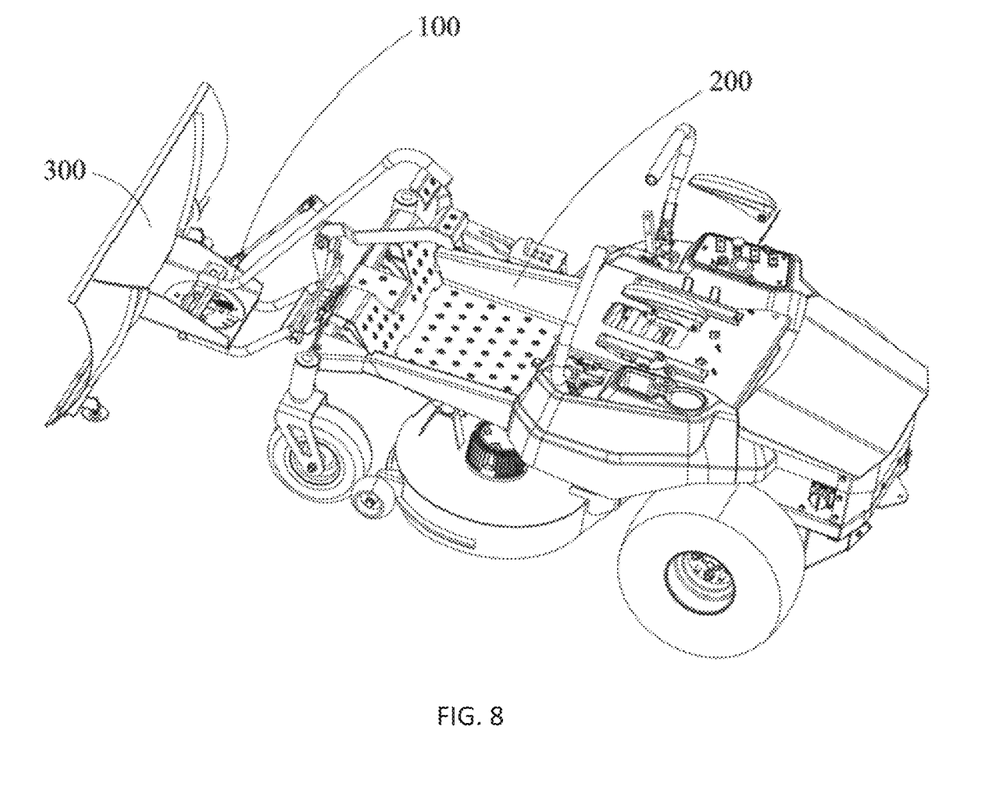
FIG. 8 is a perspective view of the mower system in accordance with one embodiment of the present invention, showing an attachment is connected to the mower through the connecting device.

Referring to FIG. 8, when the connecting device 100 of the present invention is used, the connecting device 100 is firstly fixedly mounted on the powered mower 200 by the mounting body 11, and then an attachment 300 is fixedly mounted on the base 20 of the connecting device 100. In this embodiment, the powered mower 200 is a riding lawn mower, and the attachment 300 is a snow shovel. When the controlling rod 31 is lifted upwardly, the restoring elastic element 33 is elastically deformed, and the positioning member 32 is separated from the first and second positioning slots 1311, 1321. Then, the base 20 is driven to rotate around the pivot 41 by rotating the controlling rod 31 in a horizontal plane, so that the attachment 300 can be rotated relative to the powered mower 200 together with the base 20 for effectively adjusting the angle thereof in the working plane. When the controlling rod 31 is released, the controlling rod 31 restores under the action of the restoring elastic element 33, and the positioning member 32 cooperates with the first and second positioning slots 1311, 1321 to limit the rotation of the base 20 and the attachment 300. The distance between the base 20 and the ground can be effectively adjusted through adjusting the limiting member 141, so as to achieve adjusting the distance between the attachment 300 and the ground. When the pressing portion 1631 is pressed downwardly, the driving rod 163 rotates around the rotating shaft 161, so as to drive the driven rod 162 to rotate around the rotating shaft 161. Meanwhile the connecting rod 15 is pulled by the driven rod 162, and the connecting frame 12 and the base 20 are lifted upwardly by the connecting rod 15 relative to the mounting assembly 10, so that the attachment 300 is lifted upwardly for passing through an obstacle. In this embodiment, the controlling rod 31 is rotated manually by an operator, but in other embodiments, the controlling rod 31 may be driven by a mechanical component, such as: air cylinder, motor, etc.

Figure 9:
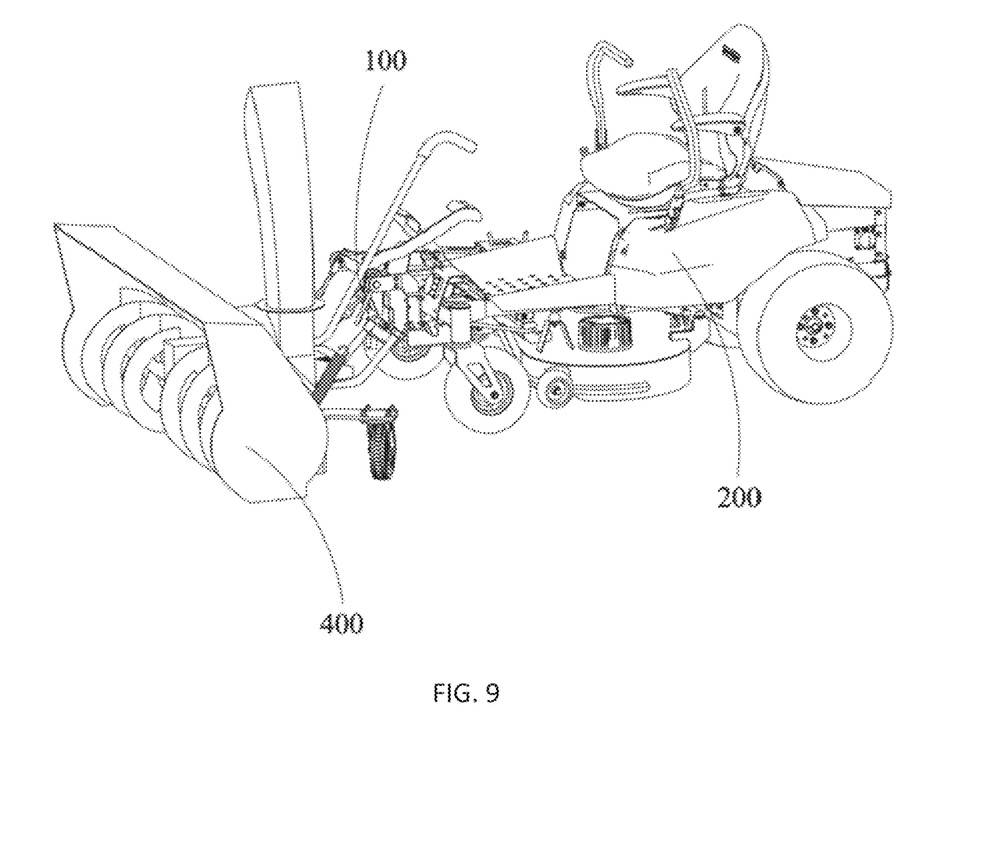
FIG. 9 is a perspective view of the mower system in accordance with one embodiment of the present invention, showing another attachment is connected to the mower system through the connecting device.

The embodiment shown in FIG. 9 is that another attachment 400 is fixedly mounted on the powered mower 200 by the connecting device 100. In this embodiment, the attachment 400 is a snow plow.

The connecting device 100 in the present invention can connect an attachment 300 to the powered mower 200 to expand the working function of the mower system and can easily adjust the working angle of the attachment during operation, so as to effectively improve utilization rate of the powered mower, and also reduce use cost and maintenance cost of the mower system. So the mower system can be operated in all seasons.

The terminology used in this application is only for the purpose of describing specific embodiment, and is not intended to limit the application. The singular forms "a", " " and "the" used in this application and the appended claims are also intended to include plural forms, unless the context clearly indicates other meanings. It should also be understood that the term "and/or" used herein refers to and includes any or all possible combinations of one or more associated listed items.

As used herein, terms such as "upper", "lower", "left", "right", "front", "back", "thickness", "radial", "axial", etc., refer to the relative position of the space. The relationship of one feature to another feature as shown in the Figures is described for purposes of illustration and not limitation. It is to be understood that the terminology of the relative position of the space may be intended to include different orientations than those shown in the drawings, and should not be construed as limiting the claim. In addition, the descriptor "horizontal" as used herein is not exactly equivalent to being perpendicular to the direction of gravity, allowing for an angled tilt.

The word "comprising" or "comprise" and other similar words mean that it covers the elements or items listed after "comprising" or "comprise" and their equivalents, and do not exclude other elements or objects.

It should be noted that when an element is referred to as being "fixed on" another element, it may be directly on the surface of the other element or may be spaced a distance from the surface of the other element. The terms "installation", "connected", "connected", "fixed" and the like shall be understood broadly, and may be, for example, a fixed connection, a detachable connection, or an integral; it may be a mechanical connection or an electric Connections or communication with each other; may be directly connected, or may be indirectly connected through an intermediate medium, and may be internal communication of two elements or an interaction relationship of two elements unless explicitly defined otherwise.

In the present invention, the first feature "on" or "under" the second feature may be a direct contact of the first and second features, or the first and second features may be indirectly through an intermediate medium, unless otherwise explicitly stated and defined. Moreover, the first feature "above", "above" and "above" the second feature may be that the first feature is directly above or above the second feature, or merely that the first feature level is higher than the second feature. The first feature "below", "below" and "below" the second feature may be that the first feature is directly below or obliquely below the second feature, or merely that the first feature level is less than the second feature.

It should be understood that the "first", "second" and similar words used in the specification and claims of this application do not denote any order, quantity or importance, but are only used to distinguish different components. "Multiple" or "multi-layer" means two or more than two.

The above are only preferred embodiments of this application, and are not intended to limit this application. Any modification, equivalent replacement, improvement, etc. made within the spirit and principle of this application shall be included in the protection of this application.

What is claimed is:

1. A connecting device, comprising:
   a mounting assembly, one end of the mounting assembly being coupled to a vehicle equipment;
   a base, the base connected to the other end of the mounting assembly, the base being configured to be connected to an operating device;
   an adjustment assembly coupled to the mounting assembly and the base;
   wherein the base is lifted upwardly with the mounting assembly as a fulcrum when the adjustment assembly is actuated by an external force,
   wherein the adjustment assembly comprises:
   an adjusting rod, the adjusting rod being mounted on the mounting assembly and capable of rotating with the mounting assembly as a pivot point;
   a connecting rod, one end of the connecting rod being connected to the adjusting rod and the other end of the connecting rod being connected to the base;
   when the adjusting rod is actuated by the external force, the adjusting rod drives the connecting rod so as to lift the base upwardly.

2. The connecting device according to claim 1, wherein an input end of the adjusting rod is configured with a pressing portion, the pressing portion being manually actuated.

3. The connecting device according to claim 1, wherein an input end of the adjusting rod is driven by a power unit.

4. The connecting device according to claim 1, wherein the base is pivotally mounted to the mounting assembly by means of a pivot axis so as to allow the base to be rotatable about the pivot axis in a plane of operation.

5. The connecting device according to claim 4, wherein the base rotates about the pivot axis at an equally spaced angle.

6. The connecting device according to claim 4, wherein an angle of rotation of the base about the pivot axis is a non-equally spaced angle.

7. The connecting device according to claim 4, wherein further comprises a control assembly connected to the base by controlling the control assembly to rotate the base to a desired position.

8. The connecting device according to claim 4, wherein further comprises a connecting frame, one end of the connecting frame being pivotally connected to the mounting assembly and the other end of the connecting frame being connected to the base.

9. The connecting device according to claim 1, wherein the mounting assembly is configured with a mount for attachment to the vehicle equipment.

10. The connecting device according to claim 9, wherein the mount is removably connected to the vehicle equipment.

11. The connecting device according to claim 1, wherein the vehicle equipment is one of a lawn mower, a bulldozer, a scraper, a tractor, a truck, a car.

12. The connecting device according to claim 1, wherein the operating device is one of a snow shovel, a snow sweeping device, a dozer blade, a transport blade, a cultivating device, a plowing device.

13. A vehicle system, comprising:
    a vehicle equipment;
    a connecting device, mounted to the vehicle equipment, the connecting device comprises:
    a mounting assembly, one end of the mounting assembly being connected to the vehicle equipment;
    a base, the base connected to the other end of the mounting assembly, the base being configured to be connected to an operating device;
    an adjustment assembly coupled to the mounting assembly and the base;
    wherein the base is lifted upwardly with the mounting assembly as a fulcrum when the adjustment assembly is actuated by an external force,
    wherein the adjustment assembly comprises:
    an adjusting rod, the adjusting rod being mounted on the mounting assembly and capable of rotating with the mounting assembly as a pivot point;
    a connecting rod, one end of the connecting rod being connected to the adjusting rod and the other end of the connecting rod being connected to the base;
    when the adjusting rod is actuated by the external force, the adjusting rod drives the connecting rod so as to lift the base upwardly.

14. The vehicle system according to claim 13, wherein an input end of the adjusting rod is actuated by an external force.

15. The vehicle system according to claim 13, wherein the base is pivotally mounted to the mounting assembly by a pivot axis so as to allow the base to be rotatable about the pivot axis in a plane of operation.

16. The vehicle system according to claim 15, wherein further comprises a control assembly connected to the base by controlling the control assembly to rotate the base to a desired position.

17. The vehicle system according to claim 13, wherein the vehicle equipment is one of a lawn mower, a bulldozer, a scraper, a tractor, a truck, a car.

18. The vehicle system according to claim 13,
    wherein the connecting device is configured to cause the operating device to rotate in a work plane and/or to be lifted in a vertical direction.

* * * * *